(12) United States Patent
Lin

(10) Patent No.: US 6,256,548 B1
(45) Date of Patent: Jul. 3, 2001

(54) METHOD FOR CONTROLLING LOTS DISPATCHES OF TOOL GROUPS

(75) Inventor: Li-Ren Lin, Chu Pei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 09/074,539

(22) Filed: May 8, 1998

(51) Int. Cl.$^7$ ........................................ G06F 19/00
(52) U.S. Cl. ............................. 700/121; 700/117
(58) Field of Search .......................... 700/121, 117, 700/90, 95, 97, 99, 100, 106, 111, 112, 113, 114, 213, 214, 217, 219, 222, 228, 229

(56) References Cited

U.S. PATENT DOCUMENTS

| | | | |
|---|---|---|---|
| 5,375,061 | * 12/1994 | Hara et al. | 364/468.07 |
| 5,757,648 | * 5/1998 | Nakamura | 364/474.11 |
| 5,818,716 | * 10/1998 | Chin et al. | 364/468.06 |
| 5,841,677 | * 11/1998 | Yang et al. | 5/7 |
| 5,880,960 | * 3/1999 | Lin et al. | 364/468.05 |
| 5,963,911 | * 10/1999 | Walker et al. | 705/7 |

* cited by examiner

Primary Examiner—Robert W. Beausoliel, Jr.
Assistant Examiner—Rita Ziemer
(74) Attorney, Agent, or Firm—Nath & Associates; Harold L. Novick

(57) ABSTRACT

The present invention discloses a method for controlling lots' dispatch of tool groups, and all the lots can be transferred to correct places for further processing. The lots are transferred to the storage places of the tool when there is only a single tool for the next process. A decision step is performed for deciding whether the storage places of the next tool group and the next-next tool group overlap when the next process contains a tool group. If there are overlapped storage places, then the lots will be moved to the overlapped storage place having minimum loading. When there is no overlapped storage place, the lots will be dispatched to the storage place having minimum loading among the next tool group. All the lots can be processed with at minimum moving steps, and all the tools perform their processes under balance loading whenever the productions increase or decrease.

6 Claims, 5 Drawing Sheets

METHOD FOR CONTROLLING LOTS DISPATCHES OF TOOL GROUPS

BACKGROUND OF THE INVENTION

1. Field of the Invention

The invention relates to a method for controlling lots dispatch of tool groups, and more particularly, to a method for balancing tool loading whenever the productions increase or decrease.

2. Description of the Prior Art

Nowadays, single production line never satisfies the desire of the modern factories. Especially for those large scaled factories, tool groups consisted of tools with the same functions are often used for mass production. However, the lots must be moved to a proper place for continuously performing the next processes, and furthermore, those tools of tool groups may be allocated everywhere inside the factories. An inferior control method usually moves the lots to an improper place for further processing, and thus seriously influence the process progresses. Therefore, it is important to maintain the tools being operating smoothly.

FIG. 1 represents a factory including six tool groups for performing six specific processes. The first tool group consists of tools 102A, 102B, and 102C for performing the first process. The second process is performed by the second tool group composed of tools 104A, 104B, and 104C. The third process is performed by only a single tool 106A. The fourth tool group consisting of tools 108A and 108B are used to perform the fourth process, and the fifth process is performed by the fifth tool group composed of tools 110A and 110B. The sixth tool group consists of tools 112A, 112B, 112C to perform the sixth process.

Each the above-mentioned tool relates to a specific storage place. For example, the tools 102A and 104C, the tools 102B and 104C, the tools 102C and 104A respectively relate to the storage places 101A, 101B, and 101C. The storage place 103A stores the lots for the tool 106A. The tools 108A and 110B, the tools 108B and 110A respectively utilize the storage places 105A and 105B, and the tools 112A, 112B and 112C also respectively store lots in the storage places 107A, 107B, and 107C.

Please note that any process can export processed lots to any tool of the tool group of the next process. For example, lots exported by the tool 102A can be routed to one of the tools 104A, 104B, 104C. Similarly, those lots processed by the tools 102B and 102C also can be exported to one of the tools 104A, 104B, and 104C. Although the sockets 101A, 101B and 101C are shared sockets, however, one or more transference steps for the lots are required sometime, especially when the selected socket is selected but overloading. For instance, when the socket 101A is overloading, it is better to move the lots to elsewhere. A redundant transference step is thus required to move the lots that will be transferred to the socket 101A. Obviously, the operators have to waste their time to move the lots, and also increase their work burdens.

A simple method for dispatching the lots is to randomly select a tool among a tool group, and to move the lots to the selected socket. Although all the tools of the tool group may work with average loading, the method can not take charge of the entire tool loading. It is clearly not an appropriate control method to be applied in the modern factories. Another control method assigns priorities to tools in each tool group. Every lot is transferred to a storage place of a tool that has highest priority until the storage place achieves full loading, and furthermore, each lot must be sent to the tool with next priority when a tool achieved its full loading.

Suppose that each the first tool of the tool groups in the FIG. 1 has the highest priority, and the loading distributions will be similar to the diagram of the FIG. 2. Obviously, a tool having higher priority will have higher loading at the same time, and those tools having lower priorities are usually idle. Unfortunately, when the factory's productions increase will also increase the differences among the tool loading, which seriously influences the factory's production. A need has been arisen to disclose a method that completely controls the lots dispatch and balances the tool loading for the modem factories.

SUMMARY OF THE INVENTION

It is an object of the invention to provide a factory to dispatch lots with minimum moving steps.

It is a further object of the invention to provide the factory a capability to balance the tool loading whether the production increase or decrease.

Accordingly, the present invention discloses a method for controlling lots' dispatches of tool groups by transferring the lots to a correct storage place at each move. At each moving step, the lots are transferred to the storage places of the tool when there is only a tool for the next process. A decision step is performed for deciding whether the storage places of the next tool group and the next-next tool group are overlapped when the next process contains a tool group. If there are overlapped storage places, then the lots will be transferred to the overlapped storage place having minimum loading. When there is no overlapped storage place, the lots will be moved to the storage place having minimum loading among the next tool group. All the lots can be processed with least moving times, and all the tools perform their processes under balance loading whenever the productions increase or decrease.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3:
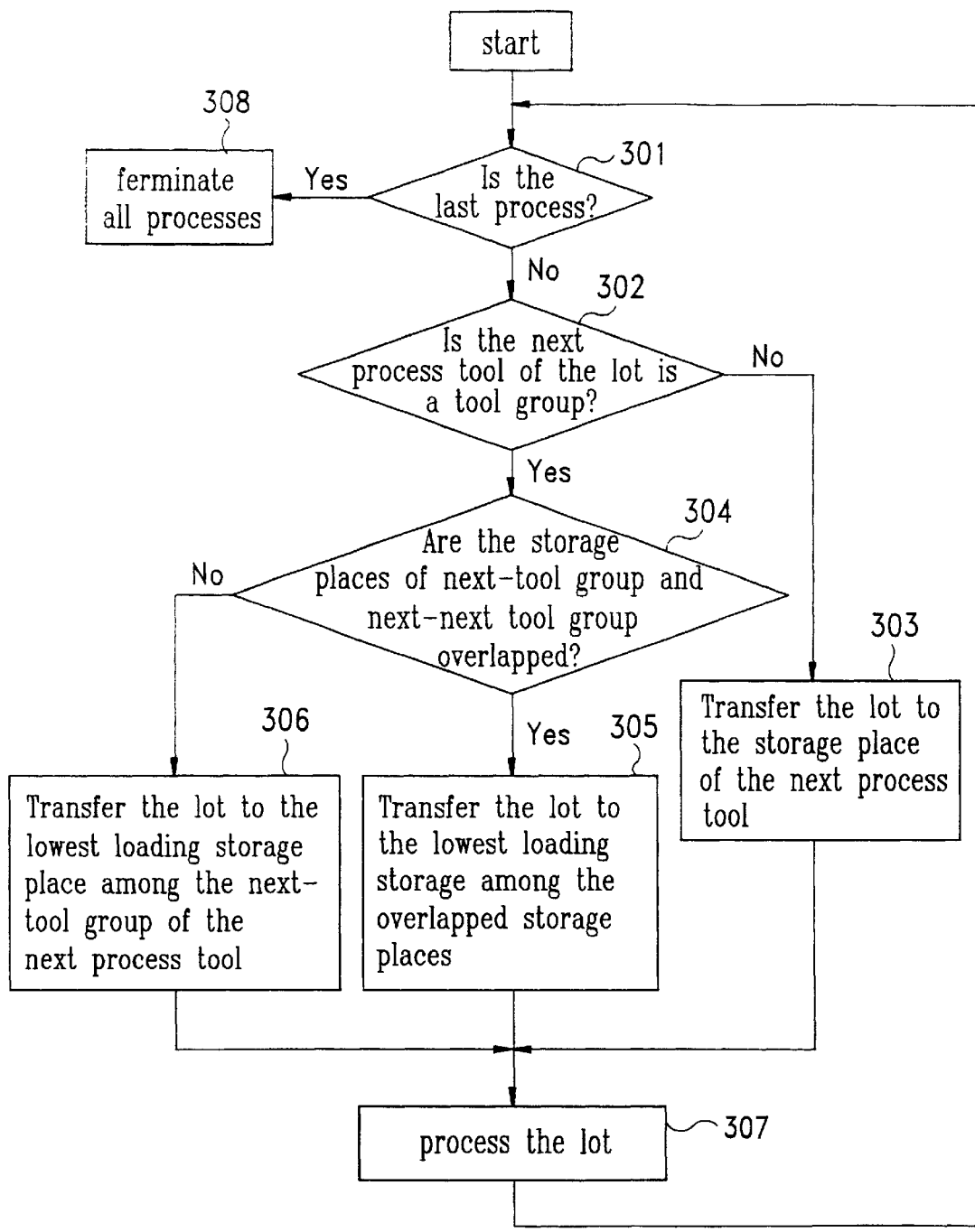
FIG. 3 illustrates a flow chart representative of the control operations according to the invention.
Figure 4:
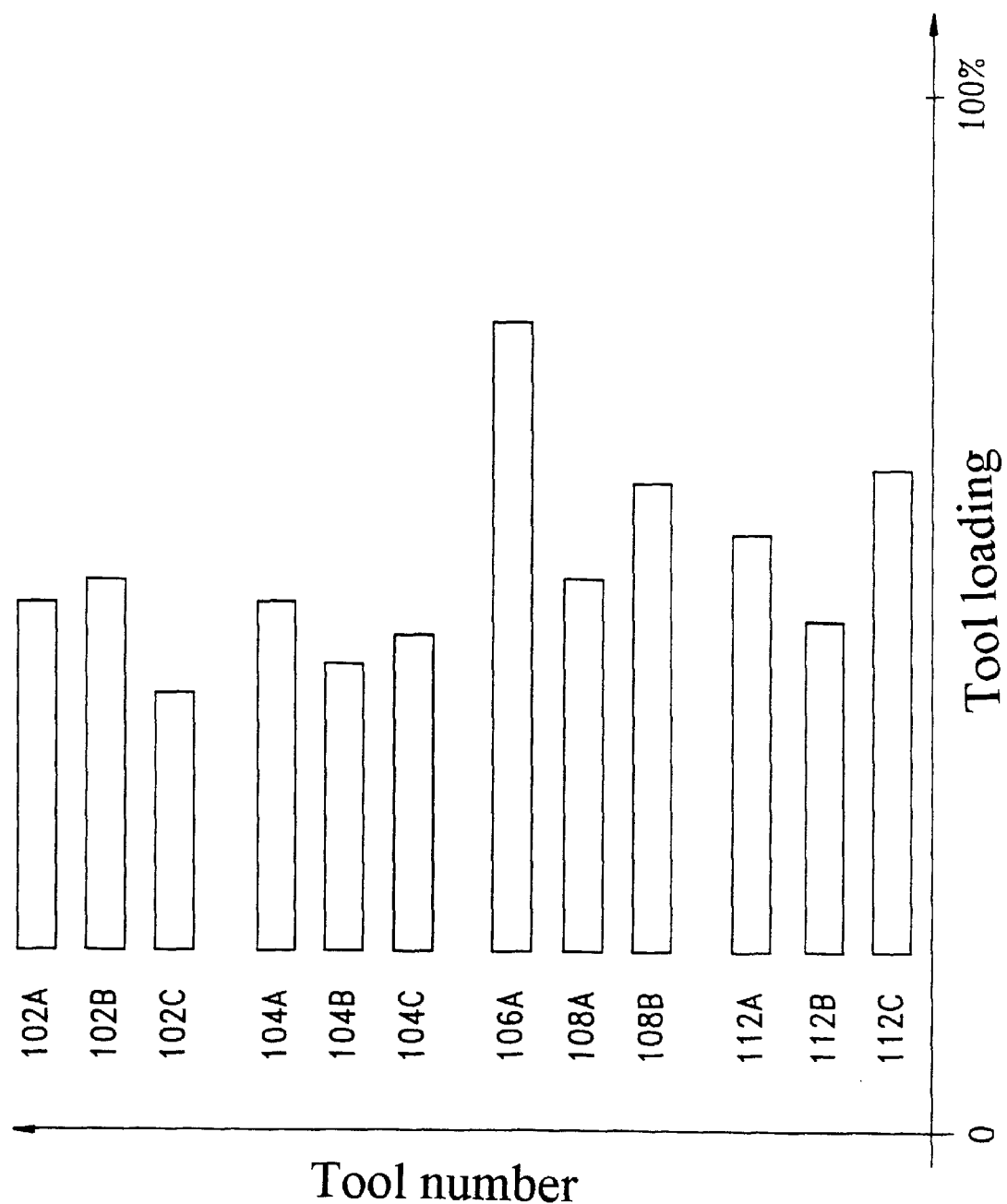
FIG. 4 shows a distribution diagram illustrative of the tool loading of the factory in the FIG. 1 while applying the control method disclosed by the invention.

FIG. 3 depicts a flow chart representative of the control operations in accordance with the invention. At first, it is necessary to decide whether the next process includes a tool group when there are further processes need to be performed (Block 301 and 302). The lots will be moved to the storage place of the next process tool when the next process only contains a single tool (Block 303). When the next process includes a tool group, it has to decide whether the storage places of the next tool group overlap with storage places of the next-next tool group (Block 304). If there are overlapped storage places, then the lots will be transferred to the overlapped storage place with the minimum loading (Block 305). The lots are moved to the storage place that has minimum loading among the next tool group if there is no overlapped storage place (Block 306). The corresponding tool then processes the transferred lots (Block 307). The aforementioned method repeats until the final process has been performed (Block 308).

Figure 1:
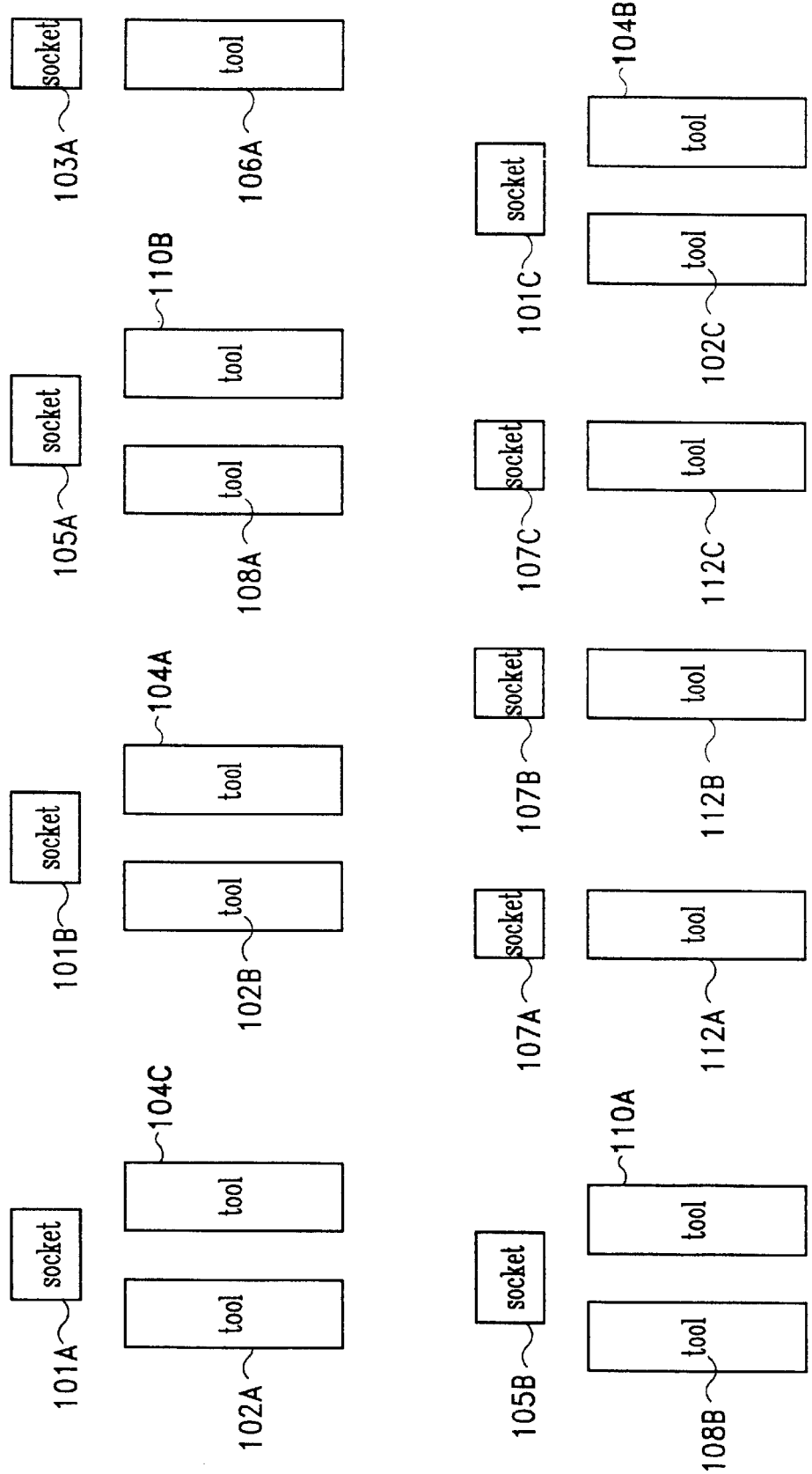
FIG. 1 represents a diagram representative of a factory with tool groups for performing specific process.
Figure 2:
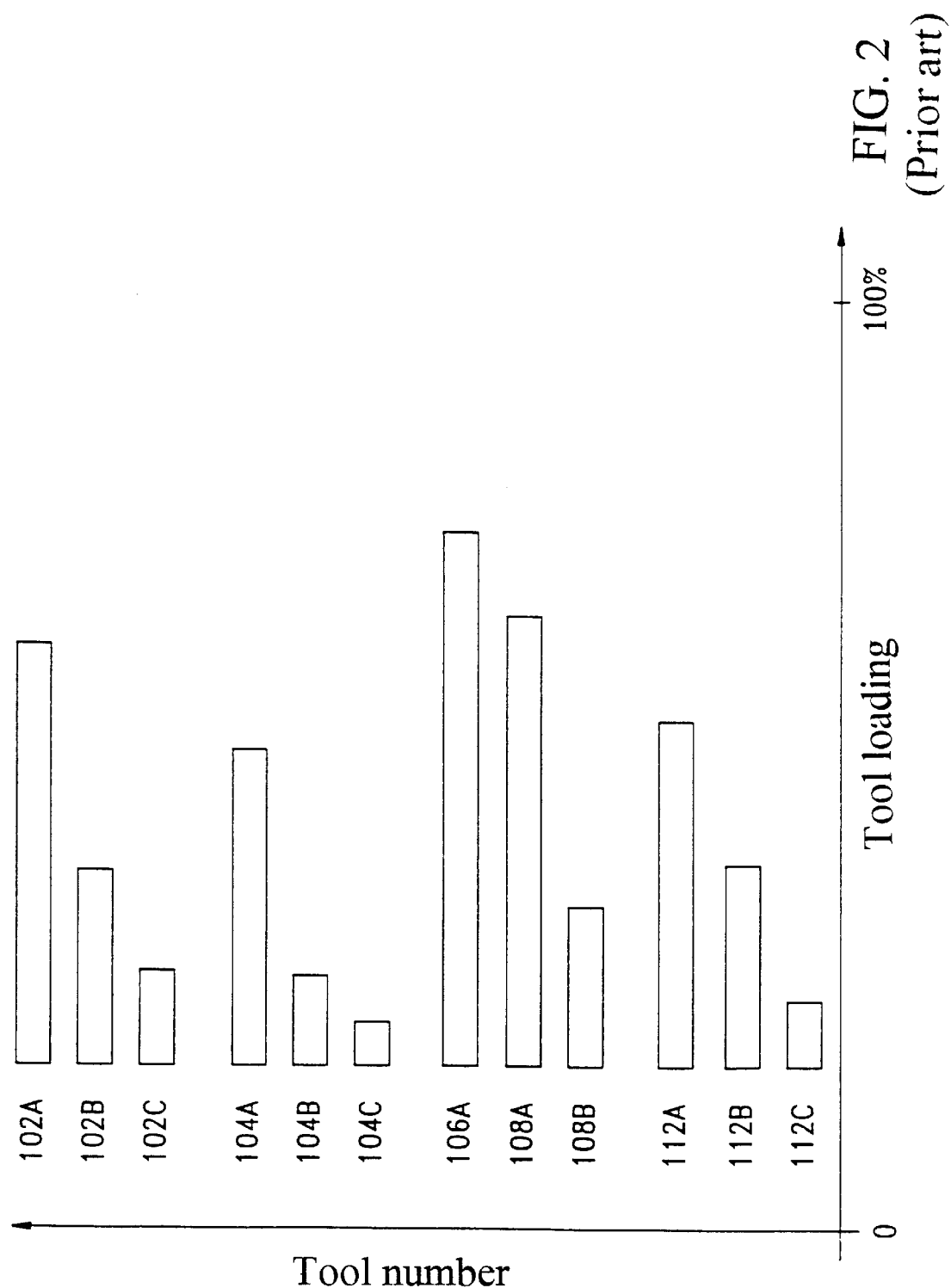
FIG. 2 is a distribution diagram illustrative of the tool loading of the factory in the FIG. 1 when each the tool has been designated a priority.

Further descriptions are given for explaining the operations of the FIG. 3 by using the factory disclosed in the FIG. 1. Assume a product manufactured by applying through the first process to the sixth process is given for following descriptions. When the lots is processed by the first process (Block 301), a decision step is performed for judging whether the storage places of the first process overlap with the counterparts of the second process in the Block 302 and 303 (because the first process includes a tool group with three tools 102A, 102B, and 102C). Obviously, there are three overlapped storage places 101A, 101B, and 101C that are respectively shared by the tools 102A and 104C, 102B and 104A, 102C and 104B. It indicates that an overlapped storage place with minimum loading has to be selected from 101A, 101B, and 101C (Block 305). Assume that storage place 101C has the minimum loading, and the lots will be transferred to it (Block 306). Please note that one moving step has been saved because the lots in the storage place 101C can be processed by the tools 102C and 104B. However, if the dispatched lots do not follows the method of the invention, the lots may be transferred once more (e.g., from tool 102A to 104B.)

Next, returns to the block 301 when the tools 102C and 104C finish their operations. The third process contains only a single tool 106A, and it means that the lots must be moved to the storage place 103 and wait for processing (Block 302 and 303).

It returns to the blocks 301 and 302 again while the third process has finished. Because the fourth and the fifth tool groups have two overlapped storage places 105A and 105B (Block 304), the overlapped storage place with minimum loading has to be selected from the storage places 105A and 105B in the block 305. If the storage place 105A has the minimum loading then the lots will be transferred to the storage place 105A, and furthermore, the tools 108A and 110A will respectively perform the fourth and the fifth processes (Block 306). Again, it returns to the blocks 301 and 302 when the fifth process has been done by the tool 110A.

The sixth process includes three tools 112A, 112B, and 112C, which do not share the storage places with next process (Block 301, 302, and 304), and the storage place with minimum loading is chosen from the storage places 107A, 107B, and 107C (Block 306). Suppose the storage place 107B has the minimum loading, then the lots will be moved to it. It will return to the step 301 when the sixth process has been done. The control method will terminate all operations because the lots have finished the above six processes (Block 308). Please note that the lots that complete all processes can be stored in a socket or be shipping directly that depends on applications. In addition, the lots can be dispatched to a right place at each move, and all the tools execute their corresponding processes under average loading whenever the throughput increase or decrease.

Moreover, the control method disclosed in the invention can be employed in any large scaled factory that needs mass productions, and any company for controlling document flow. Therefore, any the storage place of the control method can be a socket, an AS/RS (Automatic Storage Retrieve System) or a document shelf. For example, there are many processes need to be controlled in the semiconductor production for transferring the WIP (Wafer In Process) with minimum moving steps. Thus, all the tools of the semiconductor production perform their corresponding processes under balance loading whenever the productions increase or decrease. Furthermore, the documents of a company can be put in the document shelves for transferring so as to decrease the risk of losing important documents with minimum moving steps.

In fact, for those large scaled factories, all the next tool groups and the next-next tool groups may not share the storage places. For example, in the factory in the FIG. 1, the tool 102C and 104C may have independent storage places instead of using the shared storage place 101C. Under the circumstance, a loading threshold can be applied for the shared storage places 101A and 101B. When the loading of the storage places 101A and 101B are higher than the loading threshold, the lots can be moved to the independent storage place of the tool 102C. Therefore, the lots are transferred with minimum moving steps, and all the tools perform corresponding processes under balance loading.

Figure 5:
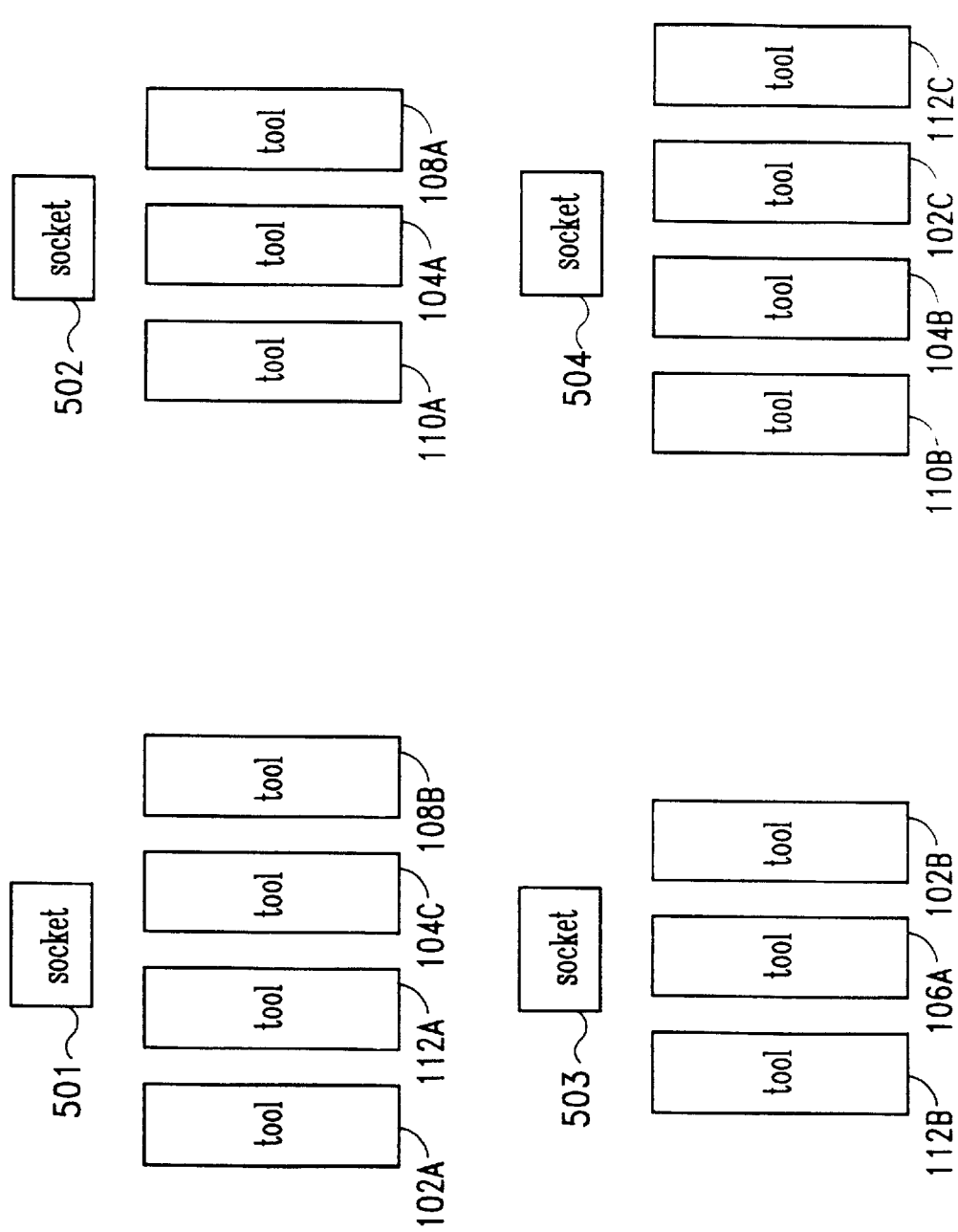
FIG. 5 represents a diagram of a factory having the same tool groups as FIG. 1, but having a different layout of the storage areas.

In addition, the method disclosed in the invention are suitable for a factory that manufactures many products and WIP by using a great deal of tools, especially when the products are ordered with a small quantity, and each socket is shared by many tools. Please refer to FIG. 5, which represents a factory contains the same tools in the FIG. 1, but only four sockets 501, 502, 503, 504 are employed to store the lots. The socket 501 stores the lots processed by the tool 102A, 112A, 104C, and 108B, and the socket 502 is used to store the lots processed by the 110A, 104A and 108A. Furthermore, the lots processed by the tool 112B, 106A, and 102B are transferred to the socket 503, and the lots processed by the tool 110B, 104B, 102C, and 112C are transferred to the socket 504. Because each tool of the factory can be used to manufactured amount of lots, an operator transfers the processed lots to the socket with less loading the others to continue sequent processes. However, the operator does not need to know which sequent processes process the lots.

For example, a product A is required to be processed a sequence of the following: the first process, the second process, the sixth process, and then the third process. In addition, a product B is manufactured by an order of: the first process, the fourth process, the second process, the fifth process, and the third process. Obviously, the operator that is responsible to handle the first process only needs to move the processed lots to the socket with less loading between the sockets 501 and 504 to continue the second and sixth processes. Then, the operator that is responsible to handle the second and the sixth processes retrieve the lots from the socket 501 or 504. As noted, the operator that is responsible to handle the sixth process transfers the processed lots to the socket 503 to wait the third process to be performed.

Similarly, when manufacturing the product B, the operator that is responsible to handle the first process only needs to move the processed lots to the socket with less loading between the sockets 501 and 502 to continue the fourth and second processes. Then, the operator that is responsible to handle the fourth and the second processes retrieve the lots from the socket 501 or 502. Noted again, the operator that is responsible to handle the second process transfers the processed lots to the socket with the minimum loading between the sockets 501 and 504 to wait the fifth process to be performed. After the lots are completely processed by the fifth process, the lots are then routed to the socket 503 to the wait for the third process to be performed.

As noted, the operators only need to move the processed lots to the destiny socket with minimum loading, and retrieve the lots for processing from the responding socket. The operators do not need to clearly understand whole the lots' process sequences, and thus decreasing the operators' work burdens. The most important thing is to prevent the processed lots from being unnecessarily transferred.

In conclusion, the present invention discloses a method for controlling lots' dispatches of the tool groups, and all the lots can be transferred to right places for performing sequent processes. The lots are moved to the storage places of the tool when there is only a single tool for the next process. A decision step is performed for deciding whether the storage places of the next tool group and the next-next tool group overlap when the next process contains a tool group. If there are overlapped storage places, then the lots will be moved to the overlapped storage place having minimum loading. When there is no overlapped storage place, the lots will be dispatched to the storage place having minimum loading among the next tool group. All the lots can be processed with at minimum moving steps, and all the tools perform their processes under balance loading whenever the productions increase or decrease.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for controlling lots dispatch among storage places, said lots being processed according to a manufacturing sequence of tool groups, each of which include at least one tool for working on said lots, said method comprising the steps of:

transferring said lots to a first storage place serving a single tool when said tool group of a subsequent process of said manufacturing sequence contains only said single tool;

transferring said lots to a second storage place having minimum loading among overlapped storage places when said tools of said tool groups for said subsequent process and for a process next following said subsequent process share said overlapped storage places; and transferring said lots to a third storage place having minimum loading among candidate storage places for said subsequent process when said tools of said tool groups for said subsequent process and for the process next following said subsequent process share no said candidate storage places.

2. The method according to claim 1, wherein each said storage place is a document shelf or a socket.

3. The method according to claim 1, wherein said step of transferring said lots to said second storage place comprises a step of performing said subsequent process and said process next following said subsequent process after said lots have been transferred.

4. The method according to claim 1, wherein said transferring said lots to said third storage place comprises a step of judging whether a loading of said overlapped storage place is higher than a loading threshold.

5. The method according to claim 4, wherein said judging step comprises a step of transferring said lots to said third storage place having minimum loading among said candidate storage places.

6. The method according to claim 1, wherein said step of transferring said lots to said third storage place comprises a step performing said subsequent process after said lots have been transferred.

* * * * *